(12) United States Patent
Tadych

(10) Patent No.: US 8,025,741 B2
(45) Date of Patent: Sep. 27, 2011

(54) METHOD OF REUSING STRIPPING COMPOUNDS

(76) Inventor: John E. Tadych, Franklin, WI (US)

( * ) Notice: Subject to any disclaimer, the term of this patent is extended or adjusted under 35 U.S.C. 154(b) by 1955 days.

(21) Appl. No.: 10/427,179

(22) Filed: Apr. 30, 2003

(65) Prior Publication Data

US 2004/0025907 A1  Feb. 12, 2004

Related U.S. Application Data

(60) Provisional application No. 60/376,728, filed on Apr. 30, 2002.

(51) Int. Cl.
*B08B 7/00* (2006.01)

(52) U.S. Cl. .......................... 134/38; 510/201

(58) Field of Classification Search .................. 134/4, 6, 134/38; 510/201, 202, 212, 263, 407; 252/79.1
See application file for complete search history.

(56) References Cited

U.S. PATENT DOCUMENTS

| | | | |
|---|---|---|---|
| 4,749,510 A | 6/1988 | Nelson | 252/166 |
| 5,334,331 A | 8/1994 | Fusiak | 252/542 |
| 5,411,678 A | 5/1995 | Sim | 252/548 |
| 5,468,415 A | 11/1995 | Jarema | 252/171 |
| 5,509,969 A | 4/1996 | Grawe | 134/2 |
| 5,618,582 A | 4/1997 | VanWinckel | 427/259 |
| 5,753,601 A * | 5/1998 | Ward et al. | 510/176 |
| 5,932,530 A | 8/1999 | Radu et al. | 510/212 |
| 6,060,439 A | 5/2000 | Doyel et al. | 510/164 |
| 6,130,195 A | 10/2000 | Doyel et al. | 510/365 |

* cited by examiner

*Primary Examiner* — Michael Barr
*Assistant Examiner* — Eric Golightly

(57) ABSTRACT

Coatings are stripped from substrates by means of a stripping composition which comprises at least one low vapor pressure solvent. The stripping compound is applied to a coated surface of the substrate and is allowed to dwell in contact with the coating. The coating and stripping compound are removed, separately or together, and the stripping compound is reused to strip the same or a different substrate.

10 Claims, No Drawings

METHOD OF REUSING STRIPPING COMPOUNDS

CROSS REFERENCE TO RELATED APPLICATION

This application claims the benefit under 35 USC §119(e) of U.S. Provisional Application No. 60/376,728 filed Apr. 30, 2002.

BACKGROUND OF THE INVENTION

This invention relates generally to stripping coatings from a substrate, and more specifically to the reuse of stripping compounds during stripping procedures and compounds suitable for such reuse.

Prior art strippers consist mainly of fast evaporating solvents such as methylene chloride, acetone, toluene, and methanol. These types of solvents have been associated with hazardous health effects and are prohibited for use under certain government regulations. Also, prior art stripping compositions only remain in a wet active stage for short periods of time because of their fast evaporation rate. Prior art stripping composition gives a small window of opportunity for removal because of the fast drying characteristics. If a prior art composition is not removed within a certain period of time the paint will then re-solidify.

Also, caustic agents, such as sodium hydroxide and potassium hydroxide, are used to strip paint. The high pH action of this caustic removal system breaks down the molecular bond of the paint film providing for effective paint removal. This occurs especially in the restoration of historical landmarks with accumulations of heavy paint layers. However, the high pH of caustic strippers will burn and discolor a substrate of wood and most other organic surfaces. On wood surfaces the outer cambium layer of wood will absorb potassium hydroxide and sodium hydroxide. Consequently, the outer cambium layer of wood cell will become weakened. If the high pH residue is not properly neutralized it remains in the outer wood fiber causing future paint and coating failures and premature degradation and staining. Likewise, aluminum and other metals are subject to pitting and staining from caustic strippers. Additionally, caustic strippers used in lead abatement and paint removal require removal by a licensed hazardous waste hauler and disposal at hazardous waste landfills at a cost of hundreds of dollars per 55-gallon drum.

The industry still needs a method to strip coatings from substrates that provides for ease of use, does not damage the substrate, does not release large amounts of organic solvents and minimizes hazardous waste.

BRIEF SUMMARY OF THE INVENTION

In one preferred embodiment, the invention is a process for stripping a coating from a surface, the process comprising the steps of: applying a stripping compound to a surface of a substrate, the surface having a coating be removed, such that the applied stripping compound overlies and contacts at least some of the coating to be removed, wherein the stripping compound comprises at least one low vapor pressure solvent; allowing the stripping compound to dwell in contact with the coating for a period of time sufficient to at least partially dissolve the coating; removing the stripping compound from the surface; removing at least some of the coating which was contacted by the stripping compound; and, repeating steps A through D at least once wherein the stripping compound of repeated step A comprises at least some of the stripping compound removed in a previous step C, wherein step D is conducted simultaneous with and/or subsequent to step C.

In another preferred embodiment, the invention is a stripping composition comprising a blend of the following low vapor pressure solvents N-methyl-2-pyrrolidone, d-limonene, tetrahydrofurfuryl alcohol, diethylene glycol monobutyl ether and petroleum distillates. The stripping composition also comprises at least one thickener to achieve a pasty consistency.

DETAILED DESCRIPTION OF THE INVENTION

The present invention is a method to reuse a stripping compound when stripping coatings from a substrate. Coatings which are amenable to the inventive method are generally organic protective coatings. Such organic protective coatings include mastic, paint, shellac, stain, varnish and waterproofing agents. As used herein mastic means a solid, resinous exudation of the tree used in varnishes. As used herein paint means a uniformly dispersed mixture having a viscosity ranging from a thin liquid to a semi-solid paste and consisting of (1) a drying oil, synthetic resin, or other film-forming component, called the binder; (2) a solvent or thinner; and (3) an organic or inorganic pigment. As used herein shellac means a natural resin used as a sealer coat under varnish; finish coat for floors, furniture, etc. As used herein stain means an organic protective coating similar to a paint, but with much lower solids content (pigment loading). As used herein varnish means an organic protective coating, similar to a paint except that it does not contain a colorant. It may be comprised of a vegetable oil (linseed, tung, etc.) and solvent or of a synthetic or natural resin and solvent. Also, as used herein waterproofing agent means any film-forming substance that coats a substrate with water-repellent layer, such as paint, a rubber or plastic film or wax, or an asphaltic compound.

In a preferred embodiment, the process comprises the steps of

A. applying a stripping compound to a surface comprising a coating or a stain to be removed such that the applied stripping compound overlies and contacts at least some of the coating or stain to be removed, wherein the stripping compound comprises at least one low vapor pressure solvent;

B. allowing the stripping compound to remain in contact with the coating or stain for a period of time sufficient to at least partially dissolve the coating or stain;

C. removing the stripping compound from the surface;

D. removing at least some of the coating or stain which was contacted by the stripping compound; and, E. repeating steps A through D at least once wherein the stripping compound of repeated step A comprises at least some of the stripping compound removed in a previous step C.

Stripping compounds which do not evaporate rapidly are usable for the inventive process. Preferably, such stripping compounds are also thick enough to avoid running or sagging while in contact with the surface being stripped. A preferred stripping compound is a paste-type paint remover comprising a blend of low vapor pressure solvents. These low vapor pressure solvents typically have a partial pressure of no more than 10 mm Hg, preferably less than 4 mm Hg, at 20° C. A typical blend comprises one or more of N-methyl-2-pyrrolidone, d-limonene, tetrahydrofurfuryl alcohol (THFA), petroleum distillates and diethylene glycol monobutyl ether. Such stripping compounds are commercially available, such as ABR® Citrus Formula Paint Remover Paste from American Building Restoration Products, Inc.

N-methyl-2-pyyrolidone (CAS No.: 872-50-4) is a solvent having a partial pressure of less than 3.20 mm Hg at 20° C. N-methyl-2-pyrrolidone is commercially available, for example, as NCI-556994 N-methylpyrrolidone value grade from the BASF Corporation. N-methyl-2-pyrrolidone is the predominant solvent in the inventive paint remover paste.

d-limonene (CAS No.: 68647-72-3) is a naturally occurring terpene which can be derived from lemons, bergamot, caraway, orange and other oils and is commercially available, for example, from Orchid Laboratories. d-limonene has a vapor pressure of about 1-2 mm Hg at 20° C. d-limonene is added in a low percentage, typically about 2% or less, of the overall paste formula.

THFA (CAS No.: 97-99-4) is a solvent having a partial pressure of 0.2 mm Hg at STP. THFA is a commercially available commodity. THFA is used in a ratio of approximately 1 part THFA to approximately 2 parts N-methyl-2-pyrrolidone.

Petroleum distillates are well-known in the art and include, for example, mixtures such as CAS No.: 64742-47-8 and 8052-41-3. One preferred petroleum distallate is 142 Solvent 66/3 available from Citgo Petroleum Corp., but other similar petroleum distallates are also contemplated within the scope of this invention. 142 Solvent comprises a mixture of $C_9$-$C_{12}$ alkanes, isoparaffins and cycloalkanes. Petroleum distillates are added in an amount less than THFA.

Diethylene glycol (CAS No.: 112-34-5) monobutyl ether is a solvent having a vapor partial pressure of 0.02 mm Hg at 20° C. Diethylene glycol monobutyl ether is a commercially available product manufactured by Eastman Chemical Co., Union Carbide and Shell. Diethylene glycol monobutyl ether is added as a low percentage, typically about 1% or less, of the overall paste formula.

The inventive stripping compound is free of methylene chloride, acetone, toluene, methanol or other fast evaporating solvents.

The low vapor pressure solvents are thickened into a paste through the addition of thickeners, preferably a clay, such as AttaGel™50 (an attapulgite clay) and other thickeners such as joint cement powder (a mixture of mica calcium carbonate and calcium sulfate). Typically, the paste will have a consistency approximately the same as toothpaste. A typical formula for a suitable stripping compound is shown in Table 1.

Table 1—Typical Paste Stripping Compound

Ingredients Weight %

N-methyl-2-pyrrolidone 40.8
d-Limonene 1.5
THFA 17.9
Petroleum distillates 5.5
Diethylene glycol monobutyl ether 0.7
AttaGel 50 14.2
Joint Cement Powder 19.6
Total weight 100.00

The stripping compound is preferably applied to both vertical and horizontal substrates in a thick layer. Typical layer thickness ranges between about ⅛ to ¼ inch. Its low vapor transmission rate makes it possible to leave the stripping compound on the substrate for 24 hours or longer, even after it performs its function.

The inventive stripping compound is a neutral pH composition that does not require neutralization. It will not burn or discolor wood, organic substrates, or leave a residue in the wood fiber to cause future coating and paint failures. As such, the inventive composition may be used on substrates of wood, masonry, plastered walls or metal. Masonry includes brickwork, stonework, cement and concrete.

A hallmark of the current invention is the ability to easily recycle the paint removal paste. The low vapor pressure and low vapor transmission rate of the inventive paint removal paste results in the majority of the solvents remaining in the paste even after the paste has previously been used. For example, the paste may be applied to a substrate and allowed to dwell on the substrate for an extended period (e.g., greater than 24 hours) prior top scrapping the paste off of the substrate. The removed paste can then be reapplied to a different section of the substrate, or to a different substrate, to remove more coating. Such reuse greatly reduces the amount of material that must be disposed of, thereby decreasing the hazardous waste disposal costs for projects such as lead abatement.

EXAMPLES

A sample of ABR® Citrus Formula Paint Remover Paste was tested as a stripping compound in terms of being capable of reuse. A section of an old painted door was used as an example of a painted substrate that was to be stripped.

Two procedures were followed, both with the basic idea that the stripping compound would be applied to a painted surface, given some time to act upon the paint and then removed from the surface, concurrent with removing the paint. In all tests, the stripping compound was applied in a thickness of about ⅛ to about ¼ inch.

In Example A, after allowing time for the product to act, the stripping compound and paint were scraped off together, using a putty knife. This was effective, but it was noted that the presence of the paint scrapings made the mass of the stripping compound thicker and more difficult to spread for further use. The mass of the stripping compound was then applied to a new area and the process repeated. The results of Example A are repeated in Table 1.

In Example B, the stripping compound was removed from the surface by itself, with scraping to remove the actual paint following as a separate effort. Some of the paint might stick to the mass of the stripping compound and no effort was made to avoid this. This approach kept the mass of the stripping compound more pliable and easier to apply for subsequent uses. Again, the mass of the stripping compound was applied to a new area and the process repeated. The results for Example B are repeated in Table 2.

In both approaches, the time that the stripping compound was allowed to sit in contact with the painted surface was varied, generally in the direction of increasing as the applications were repeated.

TABLE 1

Example A: Stripping compound was applied and removed with paint scrapings.

| Area Applied | Application Length | General Comments |
| --- | --- | --- |
| 1A | 1:25 | paint removed |
| 2A | 2:05 | paint removed |
| 3A | 2:07 | paint removed |
| 4A | 17:03 | overnight paint removed |
| 5A | 3:00 | paint removed |
| 6A | 2:00 | paint removed |
| 7A | 17:42 | overnight paint removed |
| 8A | 3:03 | paint removed |
| 9A | 6:00 | paint removed |

TABLE 1-continued

Example A: Stripping compound was applied and
removed with paint scrapings.

| Area Applied | Application Length | General Comments |
|---|---|---|
| 10A | 18:00 | overnight paint removed |
| Total Areas Tested | Total Test Time | |
| 10 | 69:25 | |

TABLE 2

Example B: Stripping compound was applied and removed
followed by paint scraping in the application area.

| Area Applied | Application Length | General Comments |
|---|---|---|
| 1B | 1:05 | paint removed |
| 2B | 1:00 | paint removed |
| 3B | 1:00 | paint removed |
| 4B | 1:00 | paint removed |
| 5B | 1:00 | paint removed |
| 6B | 1:00 | paint removed |
| 7B | 2:00 | paint removed |
| 8B | 15:42 | overnight paint removed |
| 9B | 3:03 | paint removed |
| 10B | 5:00 | paint removed |
| 11B | 16:00 | overnight paint removed |
| Total Areas Tested | Total Test Time | |
| 11 | 48:50 | |

The application area sizes decrease with the number of applications as the paste gets harder to spread.

For Example A, the paint scrapings increased the necessary exposure time after the initial application. An exposure time of 3-5 hours for Example A seemed to yield the desired results no matter how many uses the product has gone through.

The initial time exposure of one hour for Example B gave good results for multiple exposures. Without the addition of the paint scrapings, Example B retained pliability for a longer period and maintained a shorter exposure time.

The product end life was not determined by this testing since the final exposure for each example still does an excellent job at removing the paint.

What is claimed is:

1. A process for stripping a coating from a surface, the process comprising the steps of
    A. applying a stripping compound to a surface of a substrate, the surface having a coating be removed, such that the applied stripping compound overlies and contacts at least some of the coating to be removed, wherein the stripping compound comprises at least one low vapor pressure solvent;
    B. allowing the stripping compound to dwell in contact with the coating for a period of time sufficient to at least partially dissolve the coating;
    C. removing the stripping compound from the surface;
    D. removing at least some of the coating which was contacted by the stripping compound; and,
    E. repeating steps A through D at least once wherein the stripping compound of repeated step A comprises at least some of the stripping compound removed in a previous step C,
    wherein step D is conducted simultaneous with armor subsequent to step C.

2. The process of claim 1 wherein the coating is at least one of paint, varnish, shellac, stain waterproofing agent or mastic.

3. The process of claim 1 wherein the substrate is at least one of wood, masonry, plaster or metal.

4. The process of claim 1 wherein the stripping compound dwells in contact with the coating for at least one hour.

5. The process of claim 4 wherein the stripping compound dwells in contact with the coating for at least 3 hours.

6. The process of claim 4 wherein the stripping compound dwells in contact with the coating for at least 24 hours.

7. The process of claim 1 wherein the stripping compound is a paste.

8. The process of claim 1 wherein the low vapor pressure solvent is selected from the group consisting of N-methyl-2-pyrrolidone, d-limonenc, tetrahydrofurfuryl alcohol, diethylene glycol monobutyl ether, petroleum distillates and combinations thereof.

9. The process of claim 1 wherein the stripping compound is applied in a thickness of at least about ⅛th inch.

10. The process of claim 9 wherein the stripping compound is applied in a thickness up to about ¼th inch.

* * * * *

UNITED STATES PATENT AND TRADEMARK OFFICE
CERTIFICATE OF CORRECTION

| | | |
|---|---|---|
| PATENT NO. | : 8,025,741 B2 | Page 1 of 1 |
| APPLICATION NO. | : 10/427179 | |
| DATED | : September 27, 2011 | |
| INVENTOR(S) | : Tadych | |

It is certified that error appears in the above-identified patent and that said Letters Patent is hereby corrected as shown below:

Column 6, line 20: Delete "armor" and insert --or--

Signed and Sealed this
Twenty-second Day of November, 2011

David J. Kappos
*Director of the United States Patent and Trademark Office*